US006973697B2

(12) United States Patent
Shen

(10) Patent No.: US 6,973,697 B2
(45) Date of Patent: Dec. 13, 2005

(54) AUTOMOBILE WIPER HOLDER WITH PRESSURIZED STABILITY, WARNING EFFECT AND VARIABLE SIZE

(75) Inventor: Shun-Tien Shen, San Chung (TW)

(73) Assignee: Janchy Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/838,237

(22) Filed: May 5, 2004

(65) Prior Publication Data

US 2005/0246852 A1   Nov. 10, 2005

(51) Int. Cl.$^7$ .............................................. B60S 1/38
(52) U.S. Cl. ......................... 15/250.201; 15/250.44; 15/250.46; 15/250.361; 15/250.39; 15/250.001; 15/250.41
(58) Field of Search ..................... 15/250.39, 250.44, 15/250.41, 250.361, 250.201, 250.4, 250.46, 15/250.001

(56) References Cited

U.S. PATENT DOCUMENTS

| | | | | |
|---|---|---|---|---|
| 3,846,864 A | * | 11/1974 | Baut et al. | 15/250.46 |
| 3,922,749 A | * | 12/1975 | Castleman et al. | 15/250.46 |
| 4,547,925 A | * | 10/1985 | Blackborow et al. | 15/250.46 |
| 5,206,969 A | * | 5/1993 | Patterson et al. | 15/250.201 |
| 5,228,167 A | * | 7/1993 | Yang | 15/250.39 |
| 5,233,721 A | * | 8/1993 | Yang | 15/250.39 |
| 5,276,937 A | * | 1/1994 | Lan | 15/257.01 |
| 5,305,190 A | * | 4/1994 | Clement | 362/503 |
| 5,383,248 A | * | 1/1995 | Ho | 15/250.32 |
| 5,546,627 A | * | 8/1996 | Chen | 15/250.39 |
| 5,867,094 A | * | 2/1999 | Tonne | 340/468 |
| 6,028,291 A | * | 2/2000 | Heisler | 219/203 |
| 6,353,961 B1 | * | 3/2002 | Lin | 15/250.001 |

* cited by examiner

Primary Examiner—Gary K. Graham
(74) Attorney, Agent, or Firm—Bacon & Thomas PLLC

(57) ABSTRACT

This invention relates to a novel automobile wiper holder with pressurized stability, warning effect and variable size, at least constituting the blade holder, the first connecting panel, the second connecting panel, the third connecting panel and the holder seat. The pressurized panel is design to be mounted on the both sides of surface of the holder seat so as to keep the wiper blade always pressed close to the windshield during the driving irrespective of the wind pressure applied to the wiper holder. The holder seat has a projected hollow body to house the a circuit linking to the lighting elements which will illuminate the transparent or translucent pressurized panel or semicircular tube in an effort to bring to the attention of the driver the poor vision in the bad weather. The second and the third connecting panels provide a plurality of retaining holes or retaining slides in collaboration with the cover panel for employing variable size of wiper blades.

4 Claims, 7 Drawing Sheets

AUTOMOBILE WIPER HOLDER WITH PRESSURIZED STABILITY, WARNING EFFECT AND VARIABLE SIZE

FIELD OF THE INVENTION

This invention provides a novel automobile wiper holder with pressurized stability, warning effect and variable size. In other word, the wiper blade will always be kept in close and stable contact with the windshield regardless how strong the wind blows; concurrently it works a warning and beautification, applicable with a variety of wiper blade.

BACKGROUND OF THE INVENTION

In the prior art of wiper holder for the automobile, the general practice is to add a pressurized panel on one side of the wiper holder to produce a reciprocating movement so as to wipe off the rainwater built up on the windshield, and to maintain good vision for the driver in the front of the driving way. Because of the one side pressurized panel, the wiper blade is always held in loose contact with the surface of the windshield, so the rain water can not be wiped off in one stroke. In addition, the prior art of wiper holder is not retractable, inconvenient for installing variable size of the wiper blade.

In general, it is bad habit for most drivers to neglect turning on the headlamps after the sunset or in the early evening because they feel that there is sufficient light for safe driving which is easy to lead to an accident. In the fog weather, the fog lamp gives the driver a good vision in the driving way, but a poor warning effect to the driver coming in the opposite direction. The fog lamp is static; the warning effect is not effective. Driving in the rainy day, the wiper provides a good vision, but no warning effect in night driving; the accident rate remains still high.

Because of these predominant weaknesses inherent in the prior art of the wiper holder which leave room for improvement and betterment, the inventor has advocated for many years to the research and development and come up with this novel wiper holder.

SUMMARY OF THE INVENTION

The main object of this invention is provide a novel wiper holder structure with pressurized stability, and warning effect and variable size of blade, because the wiper holder is retractable and adjustable to use a variety if blade sizes suitable for use on the windshield in different area.

Another object of this invention is to provide a novel wiper holder structure with pressurized stability, warning effect and variable size of blade, in which the pressurized panels are mounted on both sides of the top surface of the holder to ensure that the wiper blade is in close and stable contact with the windshield irrespective of how strong the wind is against the windshield, and the rainwater built up on the windshield will be entirely wiped off in one stroke. The additional wire circuit offers the lighting element which serves as a warning device in the bad weather where the vision is very poor.

Another object of this invention is to provide a novel wiper holder structure with pressurized stability, warning effect and variable size of blade in which the lighting element will illuminate the whole wiper holder along the pressurized panel which display the driver special personality, decoration and good looking.

The special features of this invention are explained in great detail with the preferable embodiments as illustrated in the drawings attached.

DETAILED DESCRIPTION OF THE INVENTION

Figure 1:
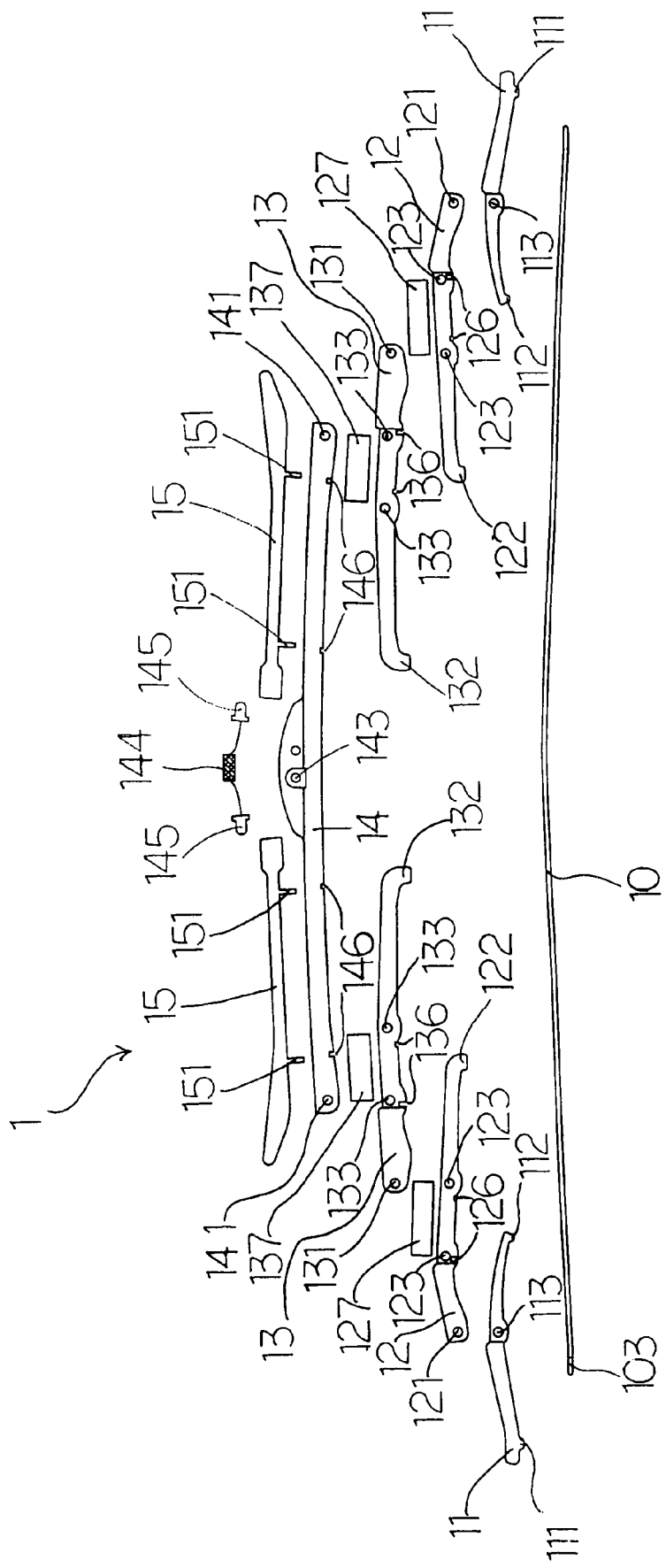
FIG. 1 shows the whole structure disassembly of the wiper holder of this invention.
Figure 2:
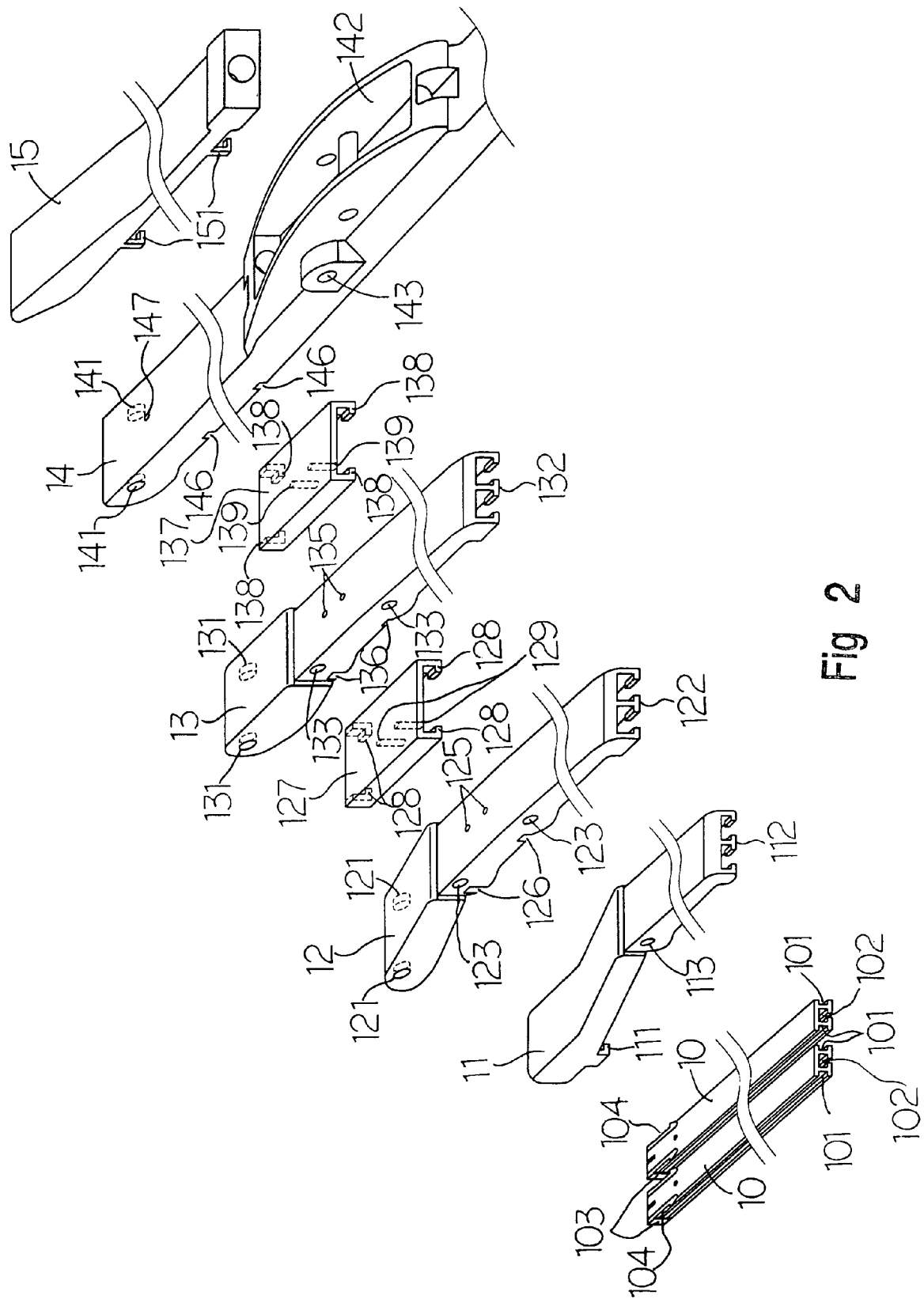
FIG. 2 shows each components of the wiper holder of this invention.
Figure 3:
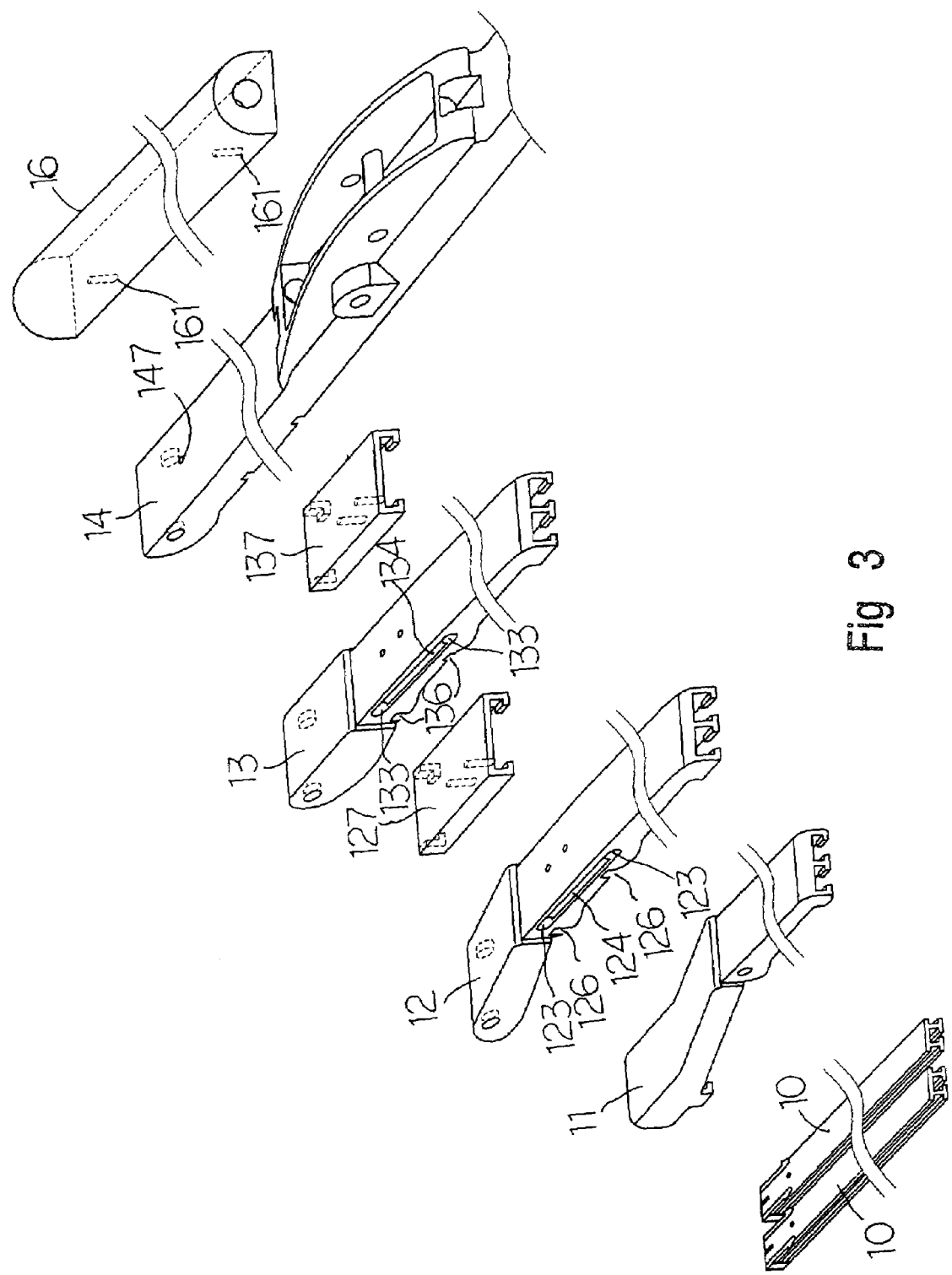
FIG. 3 shows another embodiment of the wiper holder of this invention.

As shown in FIGS. 1, 2 and 3, the novel and improved wiper holder structure (1) with pressurized stability, warning effect and variable size of blade includes a long blade holder (10) having a central groove (101) and two latches (102) to receive the wiper blade. There are lock projection (104) and retaining plate (103) at the end side for locking the blade holder (10) in place.

The first connecting panel (11) is the curved form with a claw buckle (111) on the bottom to be inserted into the central groove (101) of the blade holder (10) and fixed in place on the retaining plate (103) of the lock projection (104). The other end of the first panel has a claw hook (112) which will slide in the central groove (101) of the blade holder (10). The first panel (11) has two connecting holes (113) disposed in the opposite direction.

The second connecting panel (12) is also a curved form overlapped over the first connecting panel (11) with two tendons (121) to be linked onto the connecting holes (113) of the first panel (11). The claw hook (122) at the other end of the second connecting panel (12) will also slide in the central groove 101) of the blade holder (10) as the claw hook (112) does. The second connecting panel (12) provides a plurality of retaining hole (123) or similarly the retaining channel (124) with a plurality of retaining holes (123), and retaining holes (125) on above for receiving the lock post (129) of the top cover (127). The hook (128) of the top cover (127) can be held in the retaining hole (123) or along an indentation (126) of the retaining channel (124) of the second connecting panel (12).

The third connecting panel (13) is also a curved form riding over the second connecting panel (12) with tendons (131) at one end to be received in the retaining holes (123) or in the retaining channel (124) of the second connecting panel (12), which serves the retractable adjustment of wiper blade. The other end of the third connecting panel (13) has also a claw hook (132) to slide in the groove (101) of the blade holder (10). There is a plurality of retaining hole (133) or a retaining channel (134) along the side wall of the third connecting panel (13), and a corresponding retaining hole (135) on above to hold the lock post (139) on the top cover (137). The hook (138) of the top cover (137) will catch the retaining hole (133) or the indentation (136) of the retaining channel (134) of the third connecting panel (13).

The holder seat (14) overlaps on the third connecting panel (13) with corresponding tendons (141) inserted into the side retaining holes (133) or the retaining channel (134) for length adjustment. The holder seat (14) has a hollow projection (142) and the bolt hole (143) for holding the wiper arm. The hollow projection provides the electrical circuit (144) to be linked to the lighting elements (145). Both sides of the holder seat (14) are installed with the pressurized panels (15) or connected with a semi-circular tube (16). Each pressurized panel (15) has several hooks (151) to be locked up into the indentation (146) of the holder seat (14). Each semi-circular tube (16) has several lock post (161) to hold retaining holes (147) on the holder seat (14) for stabilized and fixed.

There is a top cover (127, 137) inlaid between the second connecting panel (12) and between the third connecting panel (13) and the holder seat (14) respectively, when it is necessary to make a reverse retractable adjustment of blade size, the top covers (127, 137) will fill up the gap formed in the adjustment.

The pressurized panel (15) or the semi-circular tube (16) is made from the transparent or translucent plastic or acrylic material which causes the lighting elements (145), the pressurized panels (15) or the semi-circular tube (16) as an integrated light.

Figure 4:
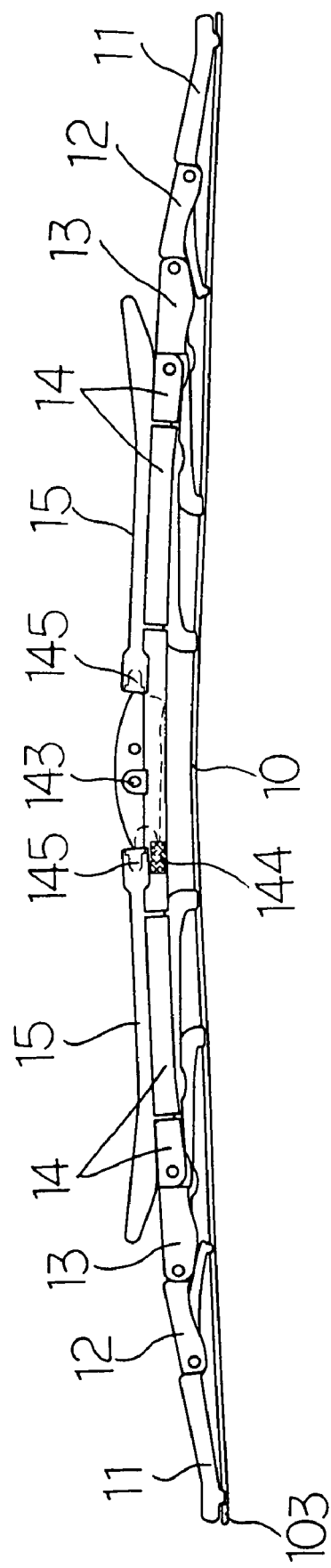
FIG. 4 shows the complete structure assembly of the wiper holder of this invention.
Figure 5:
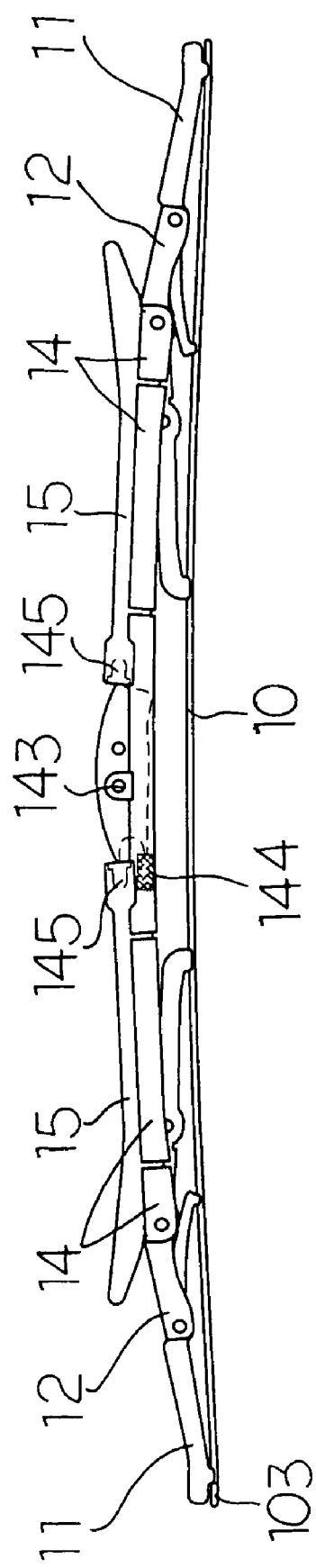
FIG. 5 shows another embodiment of the wiper holder of this invention.
Figure 7:
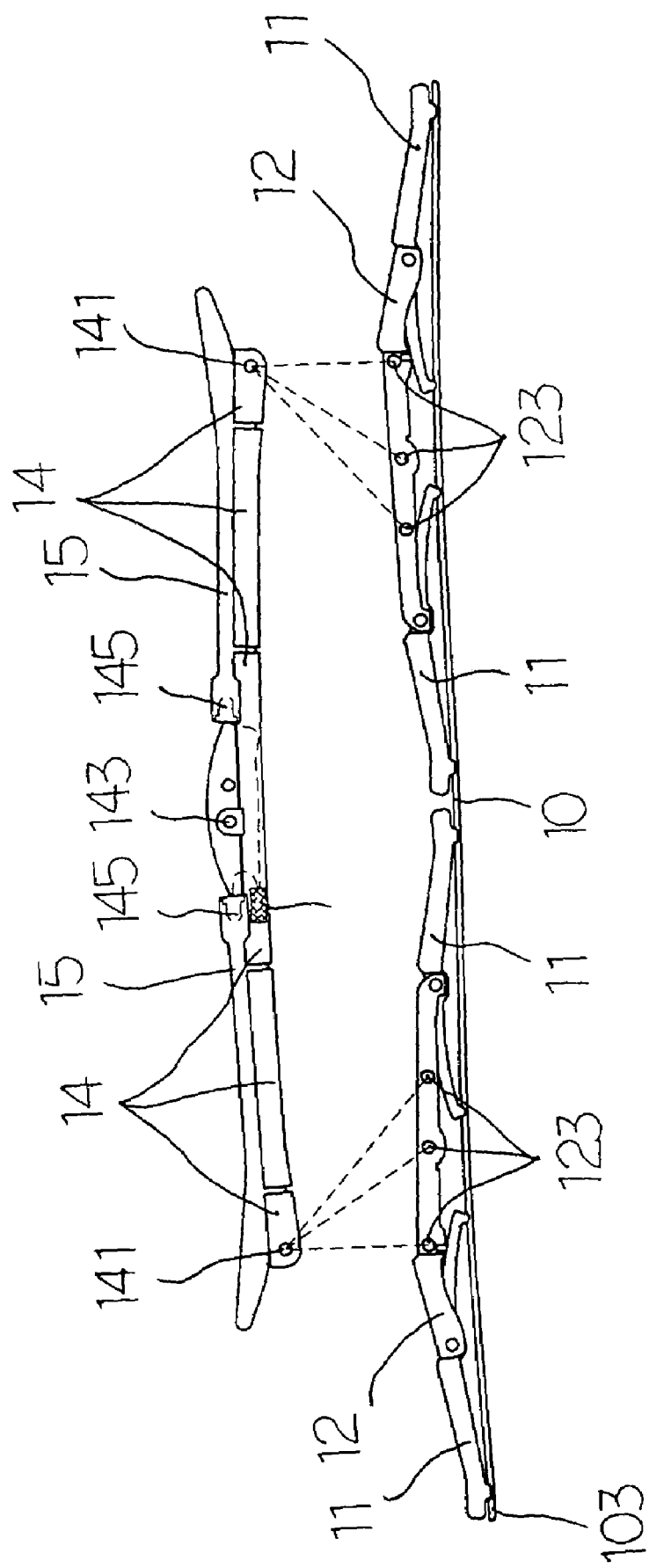
FIG. 7 shows another embodiment of the wiper holder of this invention.

As shown in FIG. 4, the third connecting panel (13) has been taken off, leaving only the first connecting panel (11), the second connecting panel (12) and the holder seat (14) to form a complete wiper holder assembly for the similar purpose. The FIG. 5 shows another embodiment in which the holder seat (14) strides on the seconding connecting panel (12) and the first connecting panel (11) is linked directly to the retaining holes (123) of the second connecting panel by means of the tendon (141) of the holder seat (14). The possible retractable adjustment is shown in FIG. 7.

Figure 6:
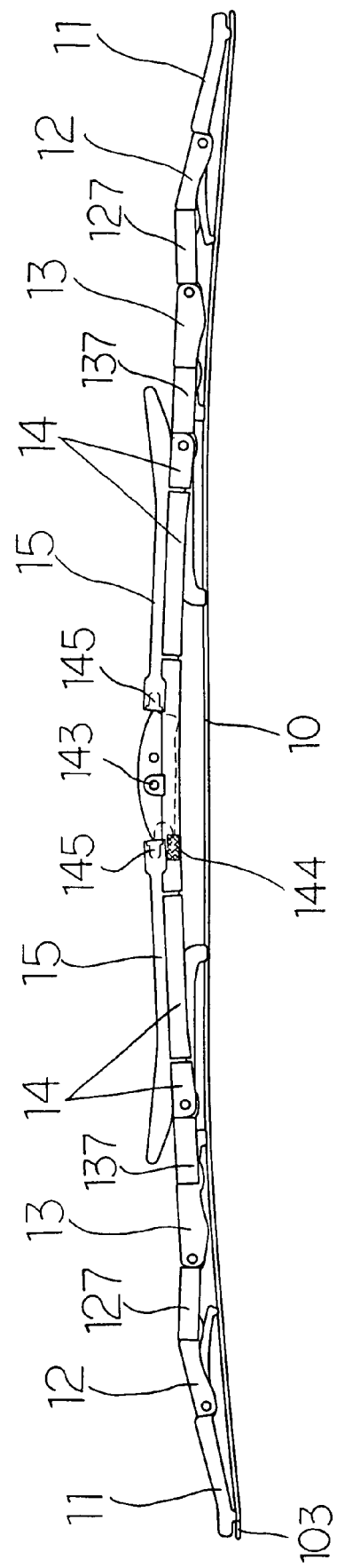
FIG. 6 shows the action of the wiper holder of this invention.

The length adjustment of wiper holder depends on the user requirement. It can shorten the length in the reverse direction by overlapping the second and the third connecting panels (12, 13) with the holder seat (14). Therefore, the top covers (127, 137) will fill up the evacuation as shown in FIG. 6.

The main purpose of the pressurized panels (15) installed on both sides of the holder seat (14) is to ensure the close and stable contact of the wiper blade to the windshield even under strong wind. It helps to keep the windshield always in the clean and neat condition. The windshield varies greatly there must be many sizes of wiper holder available all the time. The wiper holder (1) provided in this invention permits the feasible combination of the second connecting panel (12) and the third connecting panel (13) along with the holder seat (14), one size will suit all purpose. Most importance is that the lighting elements (145), the pressurized panel (15) or the semi-circular tube (16) in the holder seat (14) work as an integrated lighting unit which will give the approaching vehicle a clear warning sign while driving in the fog, rainy weather.

The circuit (144), the lighting element (145) housed in the hollow protection (142) of the holder seat (14) will certainly consume the power from the battery. If not in use, the whole assembly of the wiper holder (1) can easily take off or placed back in very convenient way.

The worth mention is that the lighting element (145) on the wiper holder (1) not only bring the attention and warning effect of the driver the poor vision in the bad weather, and easy distinguish the driver coming in the opposite direction, but also display the driver special personality, decoration and good looking through whole lighting pressurized panel (15) or semi-circular tube (16).

It is well learned that the novel wiper holder has entirely solved the inherent weaknesses the prior art of wiper holder possesses. It is justified for granting a new patent.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An automobile windshield wiper holder with pressurized stability, warning effect and variable size, comprising:

a long blade holder having first and second ends, a central groove defined lengthwise along each side thereof, the blade holder having a pair of latches located at said first end for holding a rubber blade, the blade holder having a lock projection and a retaining plate located at a side of said second end for locking the blade holder in place;

a pair of first connecting panels overlapping the first and second ends of the blade holder respectively, each first connecting panel having a claw hook formed at a first end of the first connecting panel and a claw buckle formed at a second end of the first connecting panel, each first connecting panel further having a pair of opposing side walls, and a retaining hole centrally defined in each said side wall;

a pair of second connecting panels respectively overlapping said first connecting panels, each second connecting panel having a claw hook formed at a first end of said second connecting panel and a pair of tendons formed at a second end of said second connecting panel, the tendons being engaged with the retaining holes of a first connecting panel, each second connecting panel having a pair of opposing side walls, and a plurality of retaining holes or indentations defined in each said side wall;

a pair of third connecting panels respectively overlapping said second connecting panels, each third connecting panel having a claw hook formed at a first end of said third connecting panel and a pair of tendons formed at a second end of said third connecting panel, the tendons being engaged with the retaining holes of a second retaining panel, each third connecting panel having a pair of opposing side walls, and a plurality of retaining holes or indentations defined in each said side wall;

a holder seat having first and second ends, the first end of the holder seat having defined therein a pair of tendons, the tendons being engaged with said retaining holes of one of said third connecting panels, the holder seat having a second end, the second end of the holder seat having defined therein a pair of tendons, the tendons being engaged with said retaining holes of the other of said third connection panels, the holder seat having located thereon a hollow projection with a fastener adapted for engaging with a wiper holder arm, the holder seat having a pair of opposing side walls, and a plurality of indentations formed in said side walls;

at least one lighting element disposed on said holder seat;

an electrical circuit disposed in said hollow projection and electrically connected to said at least one lighting element; and at least one pressurizing panel disposed on said holder seat, the pressurizing panel having at least a pair of side hooks engaged with said indentations.

2. The wiper holder according to claim 1, wherein retaining channels are formed in a central section of the side walls of each of said second and third connecting panels.

3. The wiper holder according to claim 1, wherein said at least one pressurizing panel is made of a transparent or translucent plastic or acrylic material, and said least one pressurizing panel is illuminated by said at least one lighting element.

4. The wiper holder according to claim 1, further comprising a top cover between each second and third connecting panel, and a top cover between each third connecting panel and said holder seat.

* * * * *